(12) United States Patent
Wilfred et al.

(10) Patent No.: US 8,836,480 B2
(45) Date of Patent: Sep. 16, 2014

(54) RADIO FREQUENCY IDENTIFICATION TAG AND ARRANGEMENT AND METHOD OF ASSOCIATING TAG DATA FROM THE TAG WITH CODE DATA FROM AN OPTICAL CODE ON THE TAG

(71) Applicant: Symbol Technologies, Inc., Holtsville, NY (US)

(72) Inventors: Sajan Wilfred, Kerala (IN); Roy Thekkethala, Kerala (IN)

(73) Assignee: Symbol Technologies, Inc., Holtsville, NY (US)

( * ) Notice: Subject to any disclaimer, the term of this patent is extended or adjusted under 35 U.S.C. 154(b) by 168 days.

(21) Appl. No.: 13/649,275

(22) Filed: Oct. 11, 2012

(65) Prior Publication Data

US 2014/0104039 A1    Apr. 17, 2014

(51) Int. Cl.
 *H04Q 5/22* (2006.01)
(52) U.S. Cl.
 USPC ...................................... 340/10.1; 340/572.1
(58) Field of Classification Search
 USPC ............................................. 340/10.1, 572.1
 See application file for complete search history.

(56) References Cited

U.S. PATENT DOCUMENTS

| 7,055,750 | B2 | 6/2006 | Carrender |
| 7,284,704 | B2 | 10/2007 | Lubow |
| 7,353,997 | B2 | 4/2008 | Tikhov et al. |
| 7,546,948 | B2 | 6/2009 | Maranov |
| 2006/0232413 | A1 | 10/2006 | Lam et al. |
| 2009/0058599 | A1 | 3/2009 | Calvarese |
| 2010/0238039 | A1 | 9/2010 | Tethrake et al. |
| 2011/0062237 | A1 | 3/2011 | Chaves |

FOREIGN PATENT DOCUMENTS

| WO | 0229706 A1 | 4/2002 |
| WO | 2006068811 A1 | 6/2006 |

OTHER PUBLICATIONS

I. Jalaly, IEEE Explore; Abstract—"RF Barcodes Using Multiple Frequency Bands"; Microwave Symposium Digest, Jun. 12-17, 2005.

*Primary Examiner* — Hai Phan
*Assistant Examiner* — Zhen Y Wu (57) ABSTRACT

A radio frequency identification (RFID) tag includes a substrate, and an optical code and an RFID assembly on the substrate. The optical code is encoded with code data. The RFID assembly contains tag data. The RFID assembly is operative for reading the optical code to obtain the code data, for associating the tag data with the code data, and for sending the associated tag data and the associated code data by radio frequency away from the RFID tag upon interrogation of the RFID tag by an RF interrogator.

18 Claims, 5 Drawing Sheets

RADIO FREQUENCY IDENTIFICATION TAG AND ARRANGEMENT AND METHOD OF ASSOCIATING TAG DATA FROM THE TAG WITH CODE DATA FROM AN OPTICAL CODE ON THE TAG

FIELD OF THE DISCLOSURE

The present disclosure relates generally to a radio frequency identification (RFID) tag and to an arrangement for, and a method of, associating tag data from the RFID tag with code data from an optical code on the RFID tag, by having the RFID tag itself read the optical code to obtain the code data.

BACKGROUND

Radio frequency identification (RFID) is known in the field of automatic data capture. A transponder, known generally as a tag, is typically attached to an object and communicates wirelessly with an RFID reader or interrogator. RFID technology is used in a variety of applications including retail, industrial, transportation, tracking, security, animal and individual identification, etc. Transfer of data via RFID technology may be used, for example, for indicating the presence of the object, such as in electronic article surveillance (EAS), for obtaining data associated with the object, or for identifying the object. In an automatic identification system, the tag is typically programmed, either in advance during manufacture, or in the field by a user, with unique information, such as tag data including an identifying serial number, a stock number, a lot or batch number, a production date, time and temperature history, or other specific information related to the object.

The RFID reader typically includes a radio frequency (RF) transceiver and an antenna which emits an RF carrier interrogation signal to activate the tag and read tag data from it and, in some cases, to supply electrical power to the tag. The RFID reader may decode the tag data, or, more typically, sends the tag data to a host computer running RFID software/middleware for processing and decoding. The RFID reader may be a mobile reader, such as a handheld reader, or a stationary hands-free reader such as a reader fixedly located in a tunnel, a door portal or a toll booth.

The RFID tag typically comprises an RFID integrated circuit (IC) chip having a microprocessor, an RF transceiver circuit, and a non-volatile memory for storing the tag data, and an omnidirectional antenna, all mounted on a dielectric substrate. The RFID tag responds to the interrogation signal by modulating the interrogation signal in accordance with its tag data. The RFID tag may have an on-board battery, e.g., an active tag, or have no on-board battery at all, e.g., a passive tag, or have a small battery on-board, e.g., a battery-assisted passive tag. The passive tag uses the RF energy transmitted by the RF reader as its energy source. The RFID tag may be read-only, or read/write, once or multiple times.

Laser-based and solid state-based optical scanners are also well known in the field of automatic data capture. Such optical scanners have been used, in both handheld and/or hands-free modes of operation, to electro-optically read optical codes, such as one- and/or two-dimensional bar code symbols, each bearing elements, e.g., bars and spaces, of different widths and reflectivities, to be decoded. By way of example, a common one-dimensional symbol used in point-of-sale applications is the Universal Product Code (UPC) printed on a label that is attached to an object to be identified. The UPC-A code is a twelve-digit optical pattern of bars and spaces that format and encode a UPC digit string. Each digit is represented by a unique pattern of two bars and two spaces. The bars and spaces are of variable width, i.e., they may be 1, 2, 3, or 4 units (modules) wide. The total width for each digit is always 7 modules. To represent the twelve digits of the UPC-A code requires a total of 7×12=84 modules.

RFID technology provides certain advantages over optical scanner technology. Optical scanners optically transfer information from optically coded printed labels, whereas RFID readers use radio waves to transfer data from RFID tags. RFID tags have a greater memory capacity than UPC-A symbols. RFID technology allows for non-contact, wireless reading. The electromagnetic field generated by the tag antenna may be constant or periodic, or activated by an actuator such as a sensor or a trigger. Advantages to RFID technology include non-contact reading of multiple tags at the same time, at a far distance, e.g., several meters away, without the need for line-of-sight interrogation of each and every tag. The major advantage of optical scanner technology is its extremely low cost.

Although RFID tags can be used as a substitute for printed labels, it is sometimes desired to simultaneously employ both RFID and optical scanner technologies on the same object. While the RFID tag may be used to store and communicate a relatively larger amount of digital information, an additional machine-readable, or human-readable, optical code is also often desired to identify the label itself, or to provide data redundancy, or to provide an alternative method for reading label information, or to provide branding. In such cases, the RFID tag is often placed in, on, under, or adjacent, the optical label.

Figure 1:
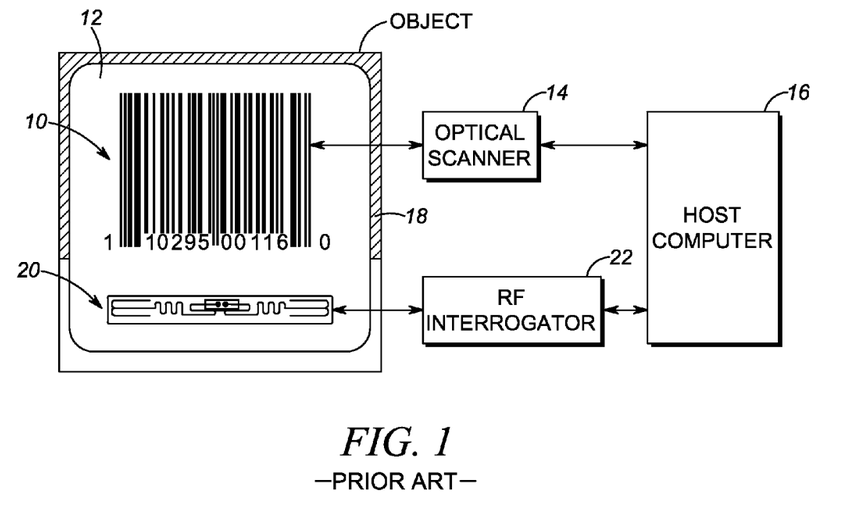
FIG. 1 is a schematic diagram of a known arrangement for reading an optical code with an optical scanner, and for reading tag data of an RFID tag with an RF interrogator in accordance with the prior art, as described above.

Thus, in accordance with the prior art, as depicted in FIG. 1, a UPC-A code 10 is printed with ink on a label 12 that is attached to an object 18, and is optically read by an optical scanner 14 that is connected to a host computer 16. An RFID tag 20 is affixed to the object 18, e.g., in, on, under, or adjacent, the label 12, and is read by RFID technology by an RF interrogator 22 that is connected to the host computer 16. Sometimes, a part, or all, of the RFID tag 20 is incorporated into the code 10. For example, the tag antenna can be configured to look like the UPC code. Even so, according to the prior art, an optical scanner 14 is always needed to read the code 10.

As advantageous as the known RFID interrogators 22 and optical scanners 14 have been in reading data from tags and labels, one concern relates to the additional requirement of associating or synchronizing the code data on the label with the tag data on the tag. As previously noted, the tag memory has to be programmed, or commissioned, with the encoded tag data, either during manufacture, or in the field either once or multiple times. In each case, the tag data has to be synchronized with the code data. This requires the optical scanner to be operated each time that the tag is commissioned. This consumes time and effort and may not always be performed. As a result, the tag data and the code data may be mismatched, and the RFID tags cannot readily be re-used.

Accordingly, there is a need to provide an arrangement for, and a method of, associating the tag data from the RFID tag with the code data from the optical code on the RFID tag, without requiring the necessity, time or effort for an optical scanner to be operated.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The tag, arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this invention relates to a radio frequency identification (RFID) tag. The tag includes a substrate, and an optical code and an RFID assembly on the substrate. The optical code is encoded with code data. The RFID assembly contains tag data. The RFID assembly is operative for reading the optical code to obtain the code data, for associating the tag data with the code data, and for sending the associated tag data and the associated code data by radio frequency away from the RFID tag upon interrogation of the RFID tag.

In a preferred embodiment, the optical code has a series of bars and spaces of different light reflectivity, and each bar is printed with an electrically conductive ink on the substrate. The RFID assembly includes a sampling circuit that overlies the bars and the spaces. More particularly, the sampling circuit includes a plurality of pairs of electrically conductive sampling lines over each bar and each space, and each pair of sampling lines is separated by a gap that overlies each bar and each space. The gap that overlies each bar is closed by the respective bar to electrically interconnect the pair of sampling lines bounding the gap. The gap that overlies each space is open to electrically disconnect the pair of sampling lines bounding the gap.

The RFID assembly includes a microprocessor that collects sampling data indicative of a number of closed gaps for each bar, a number of open gaps for each space, a width of each bar as a function of the number of closed gaps for each bar, and a width of each space as a function of the number of open gaps for each space. The sampling circuit includes a plurality of memory bit registers accessible by the microprocessor, each register being electrically connected to each pair of sampling lines and being operative for storing the sampling data as a bit in one state when the gap is closed, and as the bit in another state when the gap is open.

In accordance with another aspect of this invention, an RFID arrangement includes the aforementioned RFID tag and an RFID interrogator for interrogating the RFID tag. Upon interrogation of the RFID tag, the RFID tag reads the optical code to obtain the code data, associates the tag data with the code data, and sends the associated tag data and the associated code data by radio frequency away from the RFID tag to the RFID interrogator. A host computer is advantageously connected to the RFID interrogator. The RFID assembly and/or the RFID interrogator and/or the host computer is operative for processing the sampling data to determine the width of each bar and the width of each space.

In accordance with still another aspect of this invention, a method of associating the tag data from the RFID tag with the code data from the optical code on the tag, is performed by interrogating the RFID tag, reading the optical code by enabling the RFID tag to read the optical code to obtain the code data, associating the tag data with the code data, and sending the associated tag data and the associated code data by radio frequency away from the RFID tag when interrogating the RFID tag.

Figure 2:
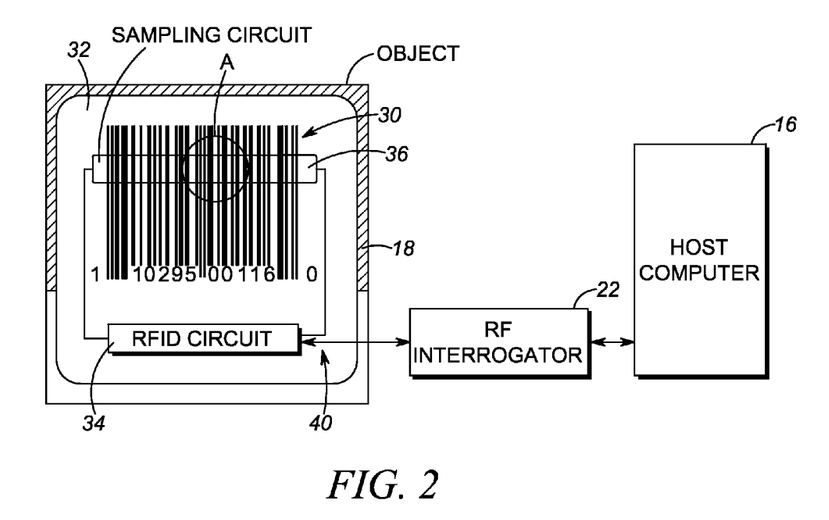
FIG. 2 is a schematic diagram of an RFID tag and arrangement for, and method of, associating tag data from the RFID tag with code data from an optical code on the RFID tag, in accordance with this invention.

Turning to FIG. 2, an optical code 30 is provided on a substrate 32 that is attached to the object 18. The optical code 30 is configured as a series or pattern of bars and spaces of different light reflectivities and widths. The pattern of the optical code 30 is encoded with code data, e.g., a string of characters used for object identification. The bars are printed with electrically conductive ink, as described in further detail below. Although the illustrated optical code is depicted as a UPC-A symbol, other one- and two-dimensional codes could be employed and printed on one side of the substrate. The substrate 32 is attached to the object 18. Advantageously, the substrate 32 can be constituted of a planar sheet of paper, foil, plastic, or like material, preferably having an adhesive layer on its opposite side. The adhesive layer adheres, or otherwise affixes, the substrate to the object 18. It will be understood that other types of labels could be employed. The object 18 can be anything or anyone to be identified by interrogation with the above-described RF interrogator 22 that is in communication with the host computer 16.

An RFID assembly is also provided on the substrate 32 to constitute an RFID tag 40. The RFID assembly includes an RFID circuit 34 (shown in detail in FIG. 3) and a sampling circuit 36 (shown in detail in FIG. 4) overlying the optical code 30. As described below, the RFID circuit 34 contains tag data, and the RFID assembly is operative for reading the optical code 30 to obtain the code data, for associating the tag data with the code data, and for sending the associated tag data and the associated code data by radio frequency away from the RFID tag 40 to the RF interrogator 22 upon interrogation of the RFID tag 40. In contrast to the prior art in which the optical scanner 14 is required to read an optical code, the RFID assembly described herein is responsible for reading the optical code 30.

Figure 3:
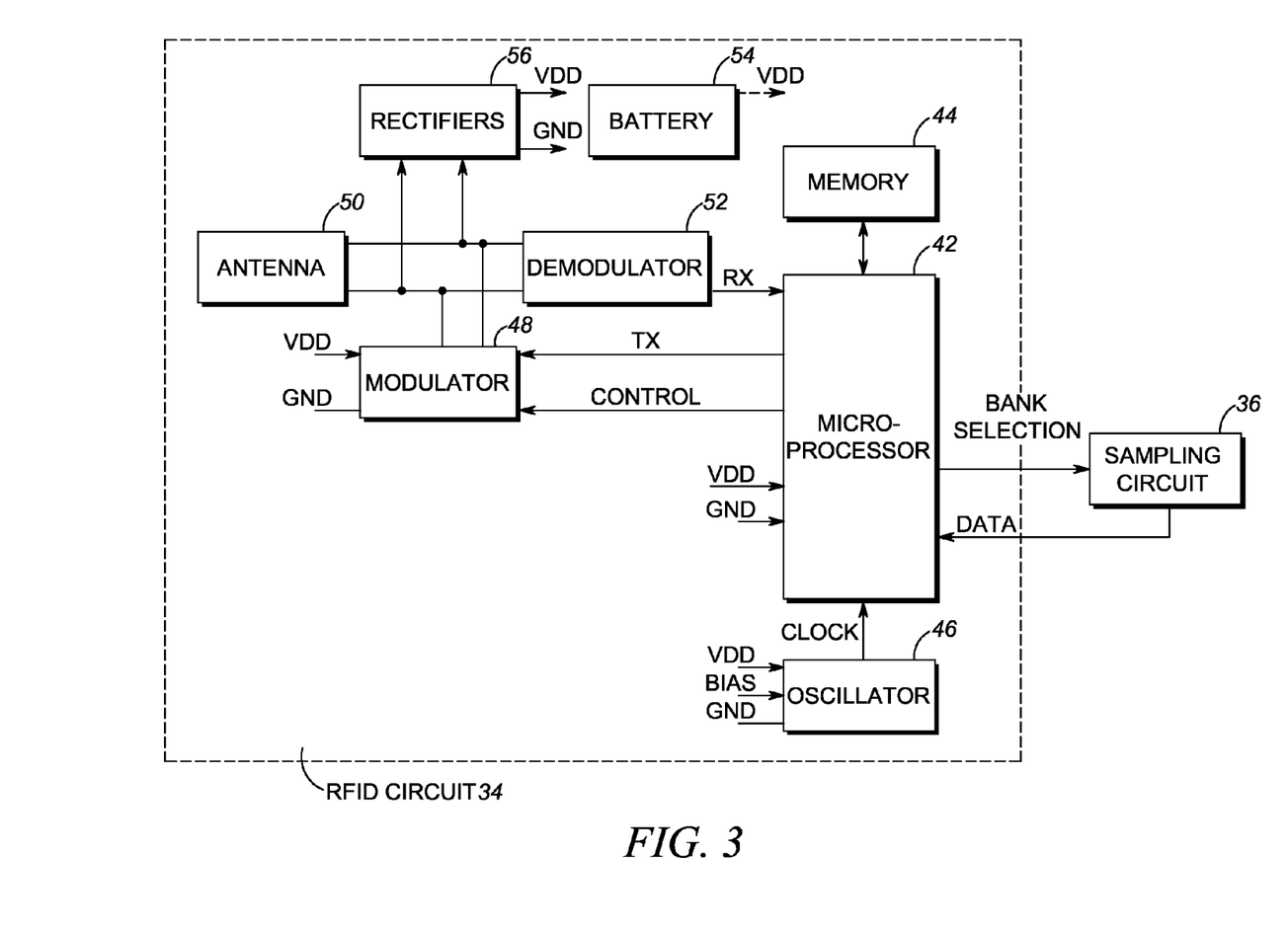
FIG. 3 is a block diagram of electrical components of the RFID tag.

As shown in FIG. 3, the RFID circuit 34 includes a programmed microprocessor 42, a non-volatile memory 44 operatively connected to the microprocessor 42 for storing the tag data, an oscillator 46 operatively connected to the microprocessor 42 for generating a clock signal, a modulator 48 operatively connected to the microprocessor 42 for modulating a transmit signal Tx generated by the microprocessor 42, an antenna 50, e.g., a dipole, loop, spiral, patch, slot, or meander, for transmitting the modulated transmit signal Tx to the RF interrogator 22 and for receiving a modulated identification signal from the RF interrogator 22, and a demodulator 52 for demodulating the modulated return signal from the RF interrogator 22 and for conducting the demodulated return signal Rx to the microprocessor 42. The modulated signal radiated by the RFID tag 40 is modulated with the tag data and the code data from the RFID tag 40, as described below. The non-volatile memory 44 may be external or internal relative to the microprocessor 42. The RFID circuit 34 optionally includes a battery 54 for supplying voltage (Vdd) to the various electrical components of the RFID assembly. If the battery 54 is not provided, then electrical power can be taken from the modulated carrier signal after rectification by the rectifiers 56.

Figure 4:
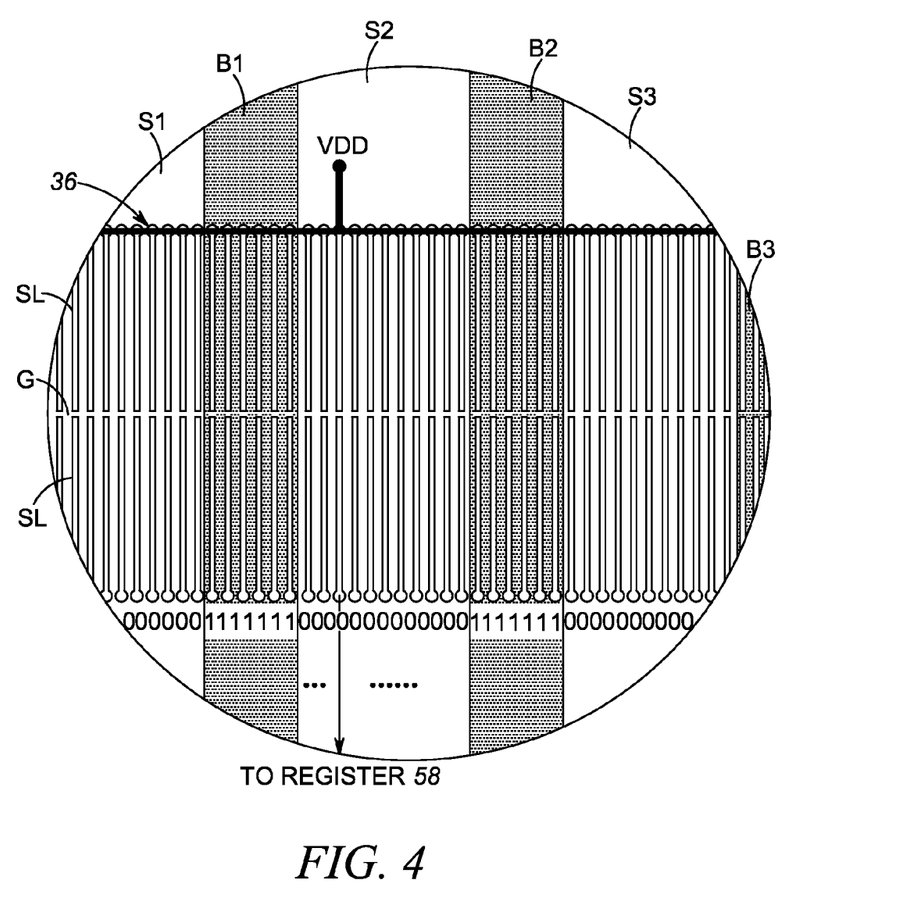
FIG. 4 is an enlarged detail of the area labeled "A" in FIG. 2 showing details of a sampling circuit overlying the optical code.

A portion of the sampling circuit 36 is shown in FIG. 4 in overlying relation with representative bars and spaces of the optical code 30, e.g., a space S1, followed by a bar B1, followed by a space S2, followed by a bar B2, followed by a space S3, and followed by a bar B3. The sampling circuit 36 includes a plurality of pairs of electrically conductive sampling lines SL over each bar and each space. Each pair of sampling lines SL is separated by a gap G that overlies each bar and each space. The gap G that overlies each bar is closed by the electrically conductive ink of the respective bar to electrically interconnect the pair of sampling lines SL bounding the gap G. The gap G that overlies each space is open, and remains open, due to the absence of any conductive ink across the gap G, to electrically disconnect the pair of sampling lines SL bounding the gap G.

By way of example, bar B1 in FIG. 4 is overlain by six pairs of sampling lines SL. Each of these six pairs have gaps G that are closed because the electrically conductive bar B1 bridges these gaps G. In effect, these six pairs of sampling lines SL are switches that have been closed by the bar B1. Electrical voltage (either Vdd or a voltage derived from Vdd) supplied to one of the sampling lines SL of each of these six pairs is conducted through the closed gaps G to the other of the sampling lines SL of each of these six pairs, and to a respective memory bit register of an array 58 of such registers, as described below.

As another example, space S1 in FIG. 4 is overlain by eleven pairs of sampling lines SL. Each of these eleven pairs have gaps G that are open because there is no electrically conductive bar to bridge these gaps G. In effect, these eleven pairs of sampling lines SL are switches that remain open by the space S1. Electrical voltage (either Vdd or a voltage derived from Vdd) supplied to one of the sampling lines SL of each of these eleven pairs is not conducted through the open gaps G to the other of the sampling lines SL of each of these eleven pairs, and is not conducted to the register array 58, as described below.

The microprocessor 42 collects from the register array 58 sampling data indicative of the number of closed gaps G for each bar (e.g., six for bar B1), the number of open gaps G for each space (e.g., eleven for space S1), the width of each bar as a function of the number of closed gaps for each bar, and the width of each space as a function of the number of open gaps for each space. In one embodiment, the microprocessor 42 determines the widths of all the bars and the spaces from the sampling data. In other, preferred embodiments, a microprocessor in the RF interrogator 22 and/or a microprocessor in the host computer 16 is used to determine the widths of all the bars and the spaces from the sampling data. No matter which microprocessor is used, the optical code 30 is decoded to obtain the code data, again without using an optical scanner.

Figure 5:
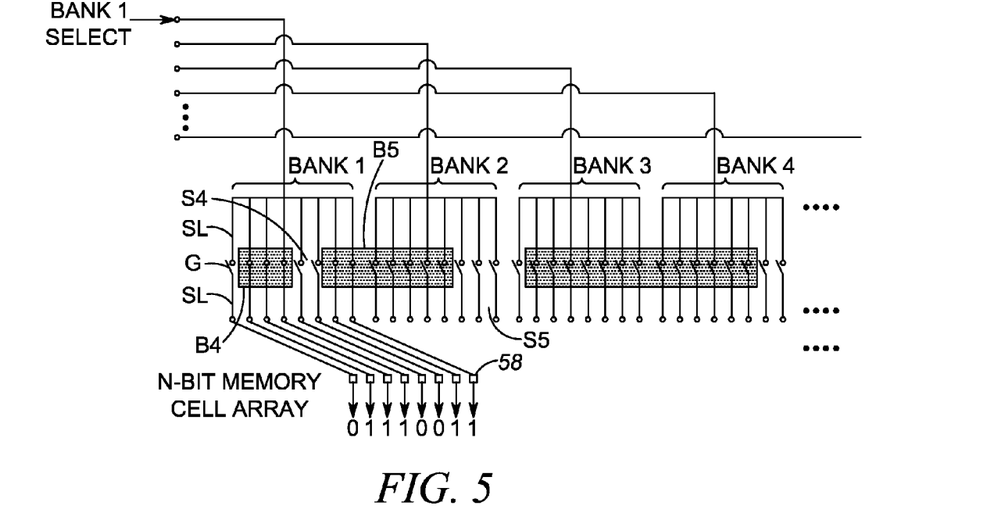
FIG. 5 is a schematic showing selection of one group of sampling lines of the sampling circuit of FIG. 4.
Figure 6:
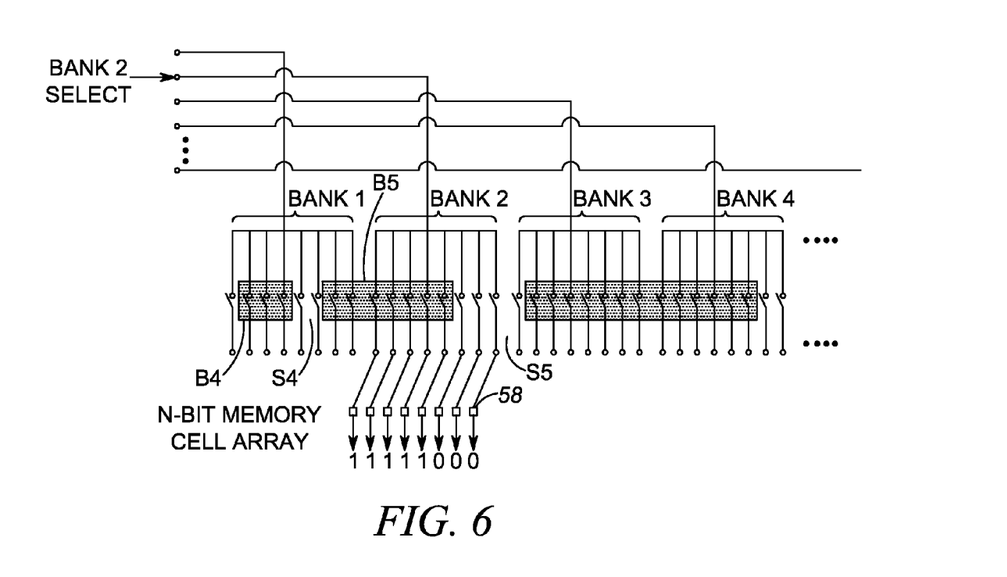
FIG. 6 is analogous to FIG. 5 and shows the selection of another group of sampling lines of the sampling circuit of FIG. 4.

More specifically, the microprocessor 42 collects the sampling data by generating and sending a series of bank selection signals to the sampling circuit 36. As shown in FIG. 5, all of the sampling lines SL are grouped into banks or groups. In this case, each bank has eight pairs of sampling lines SL, and the optical code 30 is represented by a bar B4, followed by a space S4, followed by a bar B5, followed by a space S5, and so on. The microprocessor 42 generates a first bank select signal and, as shown in FIG. 5, the bar B4 is overlain by three pairs of sampling lines SL with closed gaps, and the space S4 is overlain by two pairs of sampling lines SL with open gaps, and part of the bar B5 is overlain by two pairs of sampling lines SL with closed gaps. The microprocessor 42 then generates and sends a second bank select signal and, as shown in FIG. 6, the remaining part of the bar B5 is overlain by three pairs of sampling lines SL with closed gaps. The microprocessor 42 then continues to generate bank select signals until all the banks have been selected.

The sampling circuit 36 further includes a plurality or array 58 of memory bit registers accessible by the microprocessor 42. Each register 58 is electrically connected to each pair of sampling lines SL and is operative for storing the sampling data as a bit in one, e.g., a high, state (logic "1") when the gap G is closed, and as the bit in another, e.g., a low, state (logic "0") when the gap G is open. The microprocessor 42 and/or the microprocessor in the RF interrogator 22 and/or the microprocessor in the host computer 16 are operative, either alone or together, for determining the width of each bar and each space by counting how many logic "1" states are arranged in sequence, and how many logic "0" states are arranged in sequence. The or each microprocessor may also be used to remove noise, and ignore leading and trailing patterns, etc.

The sampling circuit 36 can be embedded across the optical code 30 during manufacture or applied onto the optical code 30 during field deployment for dynamic commissioning or automatic synchronizing the code data with the tag data. Removal of the sampling circuit 36 from the RFID tag 40 automatically decommissions the tag 40. Re-use of the RFID tag 40 is accomplished by removing the RFID tag 40 from one object, and by placing the removed RFID tag 40 on another object. The size and spacing of the sampling lines depends on the size of the optical code to be read. By way of example, it is contemplated that about 400 sampling lines each of about 1 mil width would be sufficient to entirely cover most optical codes.

After the code data has been obtained, the code data may or may not be stored in the memory 44. In either case, the microprocessor 42 automatically associates the code data with the tag data, and modulates an incoming interrogation signal from the RF interrogator 22 with the associated code data and the associated tag data, and sends a modulated return echo signal back to the RF interrogator 22 and the host computer 16 for further processing.

Figure 7:
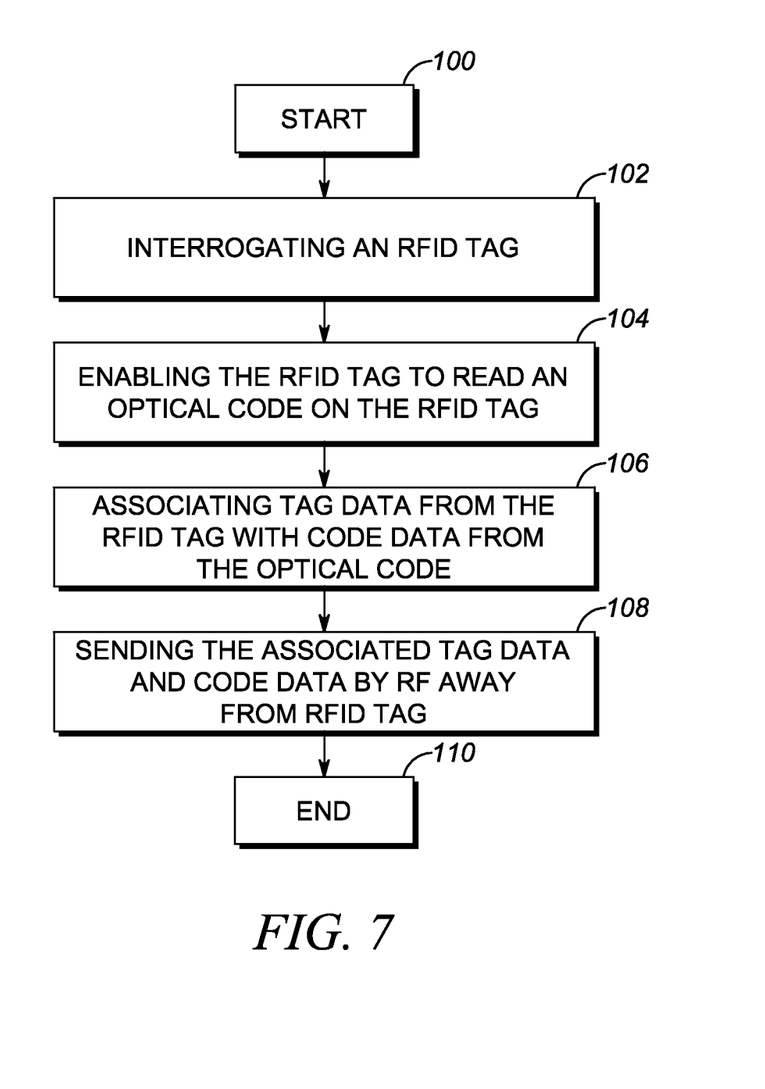
FIG. 7 is a flow chart depicting operation of a method in accordance with the present invention.

The flow chart of FIG. 7 depicts how the tag data from the RFID tag is associated with the code data from the optical code on the tag. Starting a reading session from start step 100, the RFID tag 40 is interrogated in step 102, the optical code 30 is read by enabling the RFID tag 40 to read the optical code 30 to obtain the code data in step 104, the tag data is associated with the code data in step 106, and the associated tag data and the associated code data are sent by radio frequency away from the RFID tag 40 in step 108 when interrogating the RFID tag 40, before the reading session ends at step 110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A radio frequency identification (RFID) tag, comprising:
a substrate;
an optical code on the substrate, the optical code configured with a series of bars and spaces being encoded with code data; and
an RFID assembly on the substrate, the RFID assembly containing tag data and being operative for reading the optical code to obtain the code data, for associating the tag data with the code data, and for sending the associated tag data and the associated code data by radio frequency away from the RFID tag upon interrogation of the RFID tag, and
a sampling circuit includes a plurality of pairs of electrically conductive sampling lines over each bar and each space, and wherein each pair of sampling lines is separated by a gap that overlies each bar and each space.

2. The RFID tag of claim 1, wherein the optical code has the series of bars and spaces of different light reflectivity, wherein each bar is printed with an electrically conductive ink on the substrate; and wherein the RFID assembly includes the sampling circuit overlying the bars and the spaces.

3. The RFID tag of claim 1, wherein the gap that overlies each bar is closed by the respective bar to electrically interconnect the pair of sampling lines bounding the gap, wherein the gap that overlies each space is open to electrically disconnect the pair of sampling lines bounding the gap; and wherein the RFID assembly includes a microprocessor for collecting sampling data indicative of a number of closed gaps for each bar, a number of open gaps for each space, a width of each bar as a function of the number of closed gaps for each bar, and a width of each space as a function of the number of open gaps for each space.

4. The RFID tag of claim 3, wherein the sampling circuit includes a plurality of memory bit registers accessible by the microprocessor, each register being electrically connected to each pair of sampling lines and being operative for storing the sampling data as a bit in one state when the gap is closed, and as the bit in another state when the gap is open.

5. The RFID tag of claim 1, wherein the RFID assembly includes a memory for storing the tag data, and for storing the code data read by the RFID assembly.

6. A radio frequency identification (RFID) arrangement, comprising:
   an RFID tag including an optical code configured with a series of bars and spaces encoded with code data on a substrate, and an RFID assembly containing tag data on the substrate, and a sampling circuit includes a plurality of pairs of electrically conductive sampling lines over each bar and each space, and wherein each pair of sampling lines is separated by a gap that overlies each bar and each space; and
   an RFID interrogator for interrogating the RFID tag, and for enabling the RFID tag to read the optical code to obtain the code data, to associate the tag data with the code data, and to send the associated tag data and the associated code data by radio frequency away from the RFID tag to the RFID interrogator upon interrogation of the RFID tag.

7. The RFID arrangement of claim 6, wherein the optical code has the series of bars and spaces of different light reflectivity, wherein each bar is printed with an electrically conductive ink on the substrate; and wherein the RFID assembly includes the sampling circuit overlying the bars and the spaces.

8. The RFID arrangement of claim 6, wherein the gap that overlies each bar is closed by the respective bar to electrically interconnect the pair of sampling lines bounding the gap, wherein the gap that overlies each space is open to electrically disconnect the pair of sampling lines bounding the gap; and wherein the RFID assembly includes a microprocessor for collecting sampling data indicative of a number of closed gaps for each bar, a number of open gaps for each space, a width of each bar as a function of the number of closed gaps for each bar, and a width of each space as a function of the number of open gaps for each space.

9. The RFID arrangement of claim 8, wherein the sampling circuit includes a plurality of memory bit registers accessible by the microprocessor, each register being electrically connected to each pair of sampling lines and being operative for storing the sampling data as a bit in one state when the gap is closed, and as the bit in another state when the gap is open.

10. The RFID arrangement of claim 8, and a host computer operatively connected to the RFID interrogator, and wherein at least one of the RFID assembly, the RFID interrogator and the host computer is operative for processing the sampling data to determine the width of each bar and the width of each space.

11. The RFID arrangement of claim 6, wherein the RFID assembly includes a memory for storing the tag data, and for storing the code data read by the RFID assembly.

12. A method of associating tag data from a radio frequency identification (RFID) tag with code data from an optical code configured with a series of bars and spaces on the tag, comprising:
   interrogating the RFID tag to obtain the tag data;
   reading the optical code by enabling the RFID tag to read the optical code to obtain the code data by a sampling circuit overlying the bars and the spaces with a plurality of pairs of electrically conductive sampling lines over each bar and each space, and separating each pair of sampling lines by a gap that overlies each bar and each space;
   associating the tag data with the code data; and
   sending the associated tag data and the associated code data by radio frequency away from the RFID tag when interrogating the RFID tag.

13. The method of claim 12, and configuring the optical code as the series of bars and spaces of different light reflectivity, and printing each bar with an electrically conductive ink on a substrate.

14. The method of claim 13, wherein the overlying of the bars and the spaces is performed by placing the sampling circuit over the bars and the spaces.

15. The method of claim 14, and decommissioning the RFID tag by removing the sampling circuit from the bars and the spaces.

16. The method of claim 12, wherein the gap that overlies each bar is closed by the respective bar to electrically interconnect the pair of sampling lines bounding the gap, wherein the gap that overlies each space is open to electrically disconnect the pair of sampling lines bounding the gap; and collecting sampling data indicative of a number of closed gaps for each bar, a number of open gaps for each space, and a width of each bar as a function of the number of closed gaps for each bar, and a width of each space as a function of the number of open gaps for each space.

17. The method of claim 12, and storing the tag data in a memory on the tag, and storing the code data read by the RFID tag in the memory.

18. The method of claim 12, and placing the RFID tag on an object, and re-using the RFID tag by removing the RFID tag from the object, and by placing the removed RFID tag on another object.

\* \* \* \* \*